United States Patent [19]

Krauthausen et al.

[11] Patent Number: 4,663,047
[45] Date of Patent: May 5, 1987

[54] PROCESS FOR PURIFYING WASTE WATER

[75] Inventors: Edmund Krauthausen, Cologne; Friedrich Schmidt, Wuppertal, both of Fed. Rep. of Germany

[73] Assignee: Bayer Aktiengesellschaft, Leverkusen, Fed. Rep. of Germany

[21] Appl. No.: 778,343

[22] Filed: Sep. 20, 1985

[30] Foreign Application Priority Data

Oct. 5, 1984 [DE] Fed. Rep. of Germany ....... 3436453

[51] Int. Cl.$^4$ ................................................. C02F 3/04
[52] U.S. Cl. ..................................... 210/616; 210/617; 210/631; 210/663; 210/694; 210/778
[58] Field of Search ................................. 210/616–618, 210/150, 151, 631, 661, 663, 667, 694, 778

[56] References Cited

U.S. PATENT DOCUMENTS

| | | | |
|---|---|---|---|
| 3,563,888 | 2/1971 | Klock | 210/617 |
| 3,803,029 | 4/1974 | Blecharczyk | 210/694 |
| 4,008,159 | 2/1977 | Besik | 210/617 |
| 4,076,616 | 2/1978 | Verde | 210/618 |
| 4,168,228 | 9/1979 | Mallatt et al. | 210/631 |
| 4,212,732 | 7/1980 | Humphrey | 210/669 |
| 4,237,002 | 12/1980 | Strudgeon et al. | 210/631 |
| 4,238,334 | 12/1980 | Halbfoster | 210/694 |
| 4,407,717 | 10/1983 | Teletzke et al. | 210/616 |

FOREIGN PATENT DOCUMENTS 2109022 9/1971 Fed. Rep. of Germany ...... 210/618

Primary Examiner—Benoit Castel
Attorney, Agent, or Firm—Sprung Horn Kramer & Woods

[57] ABSTRACT

The purification process is carried out in two stages. In the first stage, pulverulent active carbon in finely-divided form is added to the waste water. The solids materials are then separated by conventional mechanical separating processes. The liquid phase prepurified in this manner is then allowed to trickle in a second stage through an active carbon adsorption tower, air being forced at the same time through the adsorption tower. The process has proved particularly valuable in the purification of pesticide-containing waste water.

8 Claims, 1 Drawing Figure

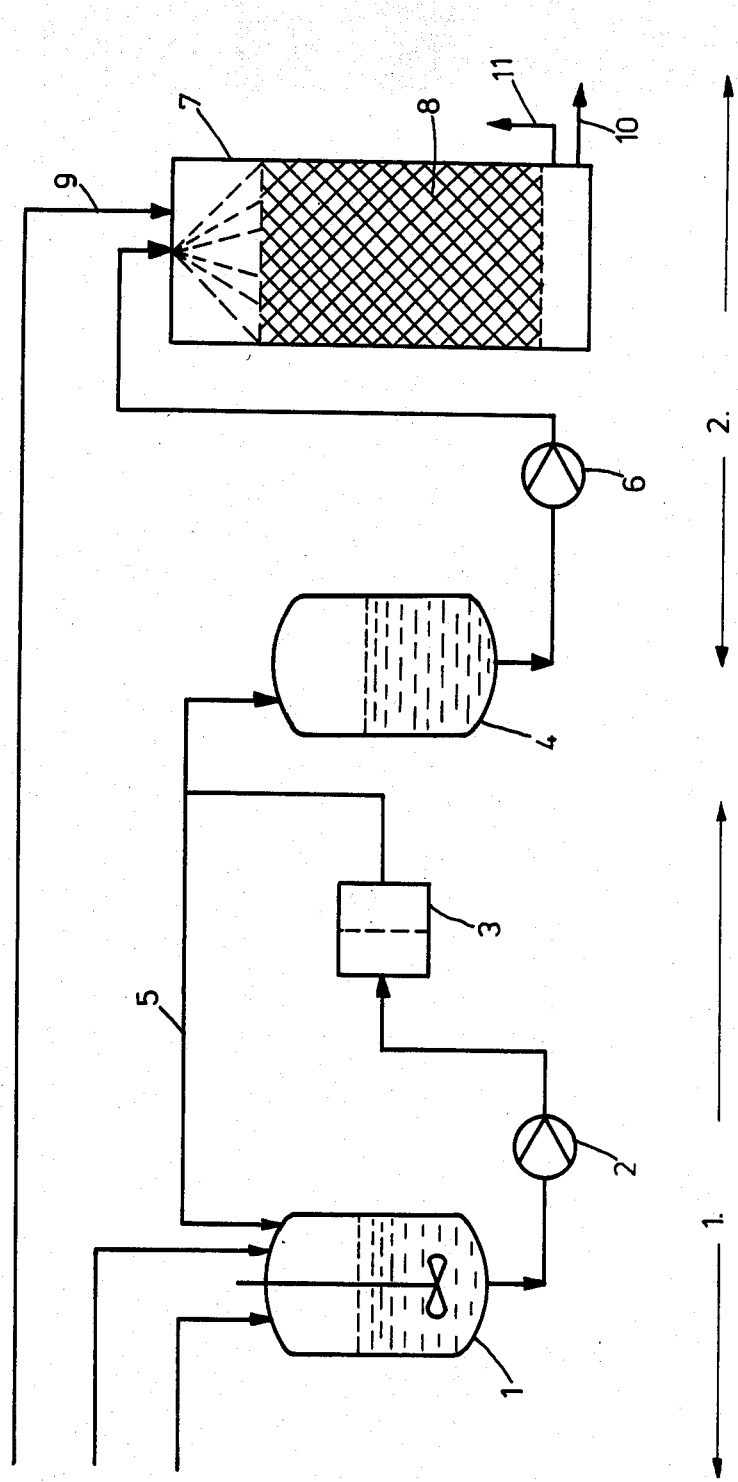

PROCESS FOR PURIFYING WASTE WATER

BACKGROUND OF THE INVENTION

This invention relates to a process for purifying waste water, particularly pesticide-containing waste water, using active carbon.

Over the past few years, waste water purification processes have become increasingly known, in which biological breakdown and adsorption are combined an active carbon. The process is technically designed in such a manner that active carbon is added to the ventilated activated sludge reservoir. In a modern variant of this process, prepurification first of all takes place by flocculation and decantation. The waste water is then passed into large open reservoirs, which contain macroporous charcoal in the form of a fixed bed. In this fixed bed, aerobic micro-organisms form colonies. The process thus consists of a mechanical preliminary stage and the subsequent biological purification stage. According to DOS No. 2,109,022 it is necessary for high purification that the charcoal used has a surface of from 10 to at most 400 m$^2$/g. Active carbons accordingly have only a slight purification effect.

A substantial disadvantage of the known processes is that the active carbon is relatively quickly adsorptively saturated and exhausted and generally cannot be regenerated without loss of the adsorption capacity. In this case, the whole active carbon filling process must be renewed, which involves a large consumption of material and is thus not economically justifiable. The purification of waste water which contains pesticidal materials from pesticide production plants poses a particular problem. After purification, the residual concentration of pesticidal materials should be reduced to extremely low values.

SUMMARY OF THE INVENTION

This is where the invention comes into play. The object was to develop a process for purifying waste water by means of active carbon, which can be operated free from disturbance over a long service life with a consistently high degree of efficiency, and particularly enables pesticide-containing waste water to be efficiently purified.

This object is achieved according to the invention in that pulverulent active carbon is added in finely-divided form to the waste water in a first stage, and the solids material is mechanically separated by sedimentation, centrifuging, floatation or filtering and then the liquid phase prepurified in this manner is injected in a second stage into an active carbon adsoprtion tower and trickled through the active carbon, air being simultaneously forced through the adsorption tower. The air is preferably allowed to flow through the adsorption tower from top to bottom. The effectiveness of the preliminary stage can be improved in an advantageous manner by adding a filtration aid to the active carbon. The adsoprtion tower is operated at a temperature of from 0° C. to 50° C., preferably from 10° C. to 30° C.

A further improvement can be achieved by adjusting the pH of the waste water to from 5 to 8, preferably from 6 to 7.

It has furthermore been found that particularly good results are obtained when the flow of waste water quantities arising in the second stage is adjusted such that the surface-specific flow through the absorption tower is from 0.4 to 2.5, preferably from 1 to 1.8 m$^3$/m$^2$.h.

The process according to the invention has proved especially valuable in the purification of relatively weakly charged waste water with a COD value of from 200 to 5000. Moreover, it has been shown that it can be successfully used for purifying waste water which contains emulsifiers and organic solvents.

The following advantages are achieved with the invention:

It has been found that in the second stage the active carbon is constantly regenerated in the adsorption tower, presumably by catalytic oxidation and/or microbiological breakdown of the adsorbed materials, such that very high service lives are achieved. In the purification of pesticide-containing waste water, a residual concentration of pesticides of below 0.1 ppm resulted after the second stage. Such a small residual concentration could not be achieved until now with other nonthermal processes. A further advantage lies in the fact that the process-technical expenditure of the total process as well as the consumption of active carbon is relatively small, such that both the investment and the operational costs can be kept low.

The invention will now be explained in more detail by means of a process scheme (fluidized bed) and examples with reference to the attached drawing.

BRIEF DESCRIPTION OF THE DRAWING

The FIGURE is a schematic representation of apparatus for carrying out the process of the invention.

DETAILED DESCRIPTION OF THE INVENTION

In the first stage, the sewage to be treated is passed into a stirrer-equipped vessel 1 and is there dispersed with from 0.05 to 0.5% by weight of pulverulent active carbon and optionally from 0.01 to 0.5% by weight of filtration aid. The dispersion obtained in this manner is then transferred by means of the pump 2 to the filter press 3. The drawn off filtrate reaches a buffer container 4. Part of the filtrate can be recirculated through the conduit 5 into the stirrer-equipped vessel 1. The first stage leads to a reduction in the COD value of 80 to 95% as well as to a material reduction of from 60 to 99% (depending on waste water quality and material). At the same time, the solids materials are removed by the filter 3. During the first stage, the greater part of the impurity content is removed, such that the subsequent second stage of the process is relieved. According to experience, the analysis values of the filtrate fluctuate in relatively wide ranges; that is, with the first stage alone, the prescribed waste water limit values cannot be adhered to.

The prepurified waste water (filtrate) is injected in the second stage by means of the pump 6 from above into a tower 7, which is filled with active carbon granulate 8. At the same time, air is forced through the conduit 9 from top to bottom through the tower 7. The purified waste water resulting after the second stage passes through the outlet 10 into the waste water channel. The outgoing air can escape through the supports 11. The tower 7 has a diameter of 1 m. The height of packing 8 of the active carbon is from 1 to 3 m. A flow of from 0.2 to 2 m$^3$ of waste water is metered into the tower 7 by means of the pump 6. The registered air flow is in the range of from 5 to 10 m$^3$/h.

It has been found that the second stage reduces the COD value again by on average 70% and the material concentration by at least 95%. It has furthermore been found that in spite of substantially fluctuating waste water concentration in the inlet, that waste water treated according to the invention shows only slight fluctuation. Thus, it is only as a result of the two-stage treatment that it can be ensured that the prescribed analysis limits are adhered to.

The above-mentioned catalytic and biological breakdown of the adsorbed materials in the tower 7 leads to a constant regeneration of the active carbon 8, so that a long service life is achieved. In practice, the tower 7 is only purified about every 8 weeks.

This occurs by flooding the tower and introducing air, such that the active carbon as a fixed bed is converted into a fluidized bed and thus the adhering sludge particles can be removed from the active carbon and drawn off as a suspension.

EXAMPLES

Example 1

Waste water from a plant protection formulation plant is treated with 0.2% by weight (based on waste water) of pulverulent active carbon (®Carboraffin A), stirred for ½ h and then filtered through a 1 m² disc filter or a 0.5 m² bag filter under a pressure of 3 bars. The waste water prepurified with powdered carbon is passed through the tower 7 as described above.

The technical data of the active carbon column are:
φ 150 mm
filling height 1800 mm
filling 10 kg of 4 mm moulded carbon TD IV (Bayer ®)
flow quantity 6 l/h The result of this waste water treatment is given in the following Table:

| water contents [mg/l] | untreated waste water | after stage 1 | after stage 2 | % reduction |
|---|---|---|---|---|
| Chemical oxygen demand (COD) | 2880 | 1389 | 403 | 86 |
| TOC (organic carbon) | 1014 | 434 | 140 | 86 |
| Carbonfuran | 22.4 | 15.6 | <0.09 | >99.6 |
| Azinphos-methyl | 10 | 0.75 | <0.06 | >99.5 |
| Ethyl parathione | 114 | 21 | 0.04 | >99.9 |
| Fuberidazole | 0.66 | 0.09 | <0.01 | >98 |
| Triadimeton | 28.6 | 7.4 | <0.33 | >98.8 |
| Propoxur | 27.8 | 22.5 | <0.25 | >99.1 |
| Fenthion | 70 | 5.3 | <0.13 | >99.8 |
| ®Erkantol BXG | 95 | 54 | <10 | >89 |
| Protective colloid 63 TUG | 153 | 127 | <10 | >93 |
| Emulsifier W | 429 | 171 | <50 | >88 |

Example 2

10 waste water samples are treated analogously to Example 1.

The results are (all values in mg/l):

| | untreated water | after powdered carbon treatment | after active carbon tower |
|---|---|---|---|
| TOC | | | |
| minimum | 340 | 130 | 53 |
| maximum | 1060 | 480 | 340 |
| average | 598 | 268 | 160 |
| elimination rate in % | = 0 = | 55 = | 73.2 |
| COD | | | |
| minimum | 843 | 351 | 55 |
| maximum | 2880 | 1389 | 865 |
| average | 1694 | 714 | 297 |
| elimination rate in % | = 0 = | 58 = | 82.5 |

Examples 3 and 4

The waste water treated according to this method is examined for fish and Daphnia toxicity.

| | TOC | COD | Daphnia toxicity | fish toxicity |
|---|---|---|---|---|
| Example 3 | | | | |
| untreated water | 532 | 1728 | 1:8000 | 1:100 |
| with active carbon treatment | 572 | 850 | 1:200 | 1:2 |
| after active carbon tower service life 4 weeks | 159 | 518 | 1:16 | 0 |
| Example 4 | | | | |
| untreated water | 1014 | 2880 | 1:8000 | 1:100 |
| after active carbon treatment | 434 | 1389 | 1:1000 | 1:16 |
| after active carbon tower service life 5 weeks | 140 | 402 | 1:32 | 0 |

Example 5

7 m³ of waste water from an extraction plant for plant protection agents are treated with 6 kg of pulverulent active carbon (®Carboraffin A) and 2 kg of kieselguhr and stirred for ½ h in the stirrer-equipped reactor 1. The waste water is filtered through a 28 m² filter press 3 and then passed through an active carbon tower 7. Technical data of the tower:
1 m diameter
3.5 m height
2.3 m height of packing of the carbon (4 mm moulded carbon LEV 755, ®Bayer)
flow quantity: 1.1³ waste water/h and 7 m³ air/h The result of this waste water treatment is given in the following Table:

| water contents [mg/l] | untreated | after stage 1 | after stage 2 | % reduction |
|---|---|---|---|---|
| COD | 2692 | 609 | 146 | 94.6 |
| Metamitron | 1.1 | 0.9 | <0.003 | >99.7 |
| Triadimefon | 20.5 | 14.4 | <0.010 | >99.9 |
| Triadimenol | 4.5 | 6.9 (?) | 0.030 | 99.3 |
| Propylene thiourea | 0.9 | 0.1 | <0.02 | >97.7 |
| unknown | 95 | 41 | 0.13 | 99.8 |

I claim:

1. A process for purifying waste water containing pesticidal emulsifiers and organic solvents comprising, in a first stage, adding pulverulent active carbon as an adsorbent to the waste water and mechanically separating solids materials including the adsorbent by sedimentation, centrifuging, filtering or flotation to obtain a prepurified liquid phase, and in a second stage, injecting the prepurified liquid phase into an active carbon adsorption tower to trickle through the active carbon and simultaneously forcing air through the adsorption tower to effect a catalytic and biological breakdown of adsorbed materials in the tower said adsorption tower being operated at a temperature of from 0° C. to 50° C., and adjusting the flow quantity arising in the second stage such that the surface-specific flow through the absorption tower is from 0.4 to 2.5 m$^3$/m$^2$.h.

2. A process according to claim 1, comprising forcing the air to flow through the adsorption tower from top to bottom.

3. A process according to claim 1 or 2, further comprising adding a filtration aid to the active carbon in the first stage.

4. A process according to claim 1, further comprising operating the adsorption tower at a temperature of from 10° C. to 30° C.

5. A process according to claim 1, further comprising adjusting the pH of the waste water to from 5 to 8.

6. A process according to claim 1, further comprising adjusting the flow quantity arising in the second stage such that the surface-specific flow through the adsorption tower is from 1 to 1.8 m$^3$/m$^2$.h.

7. A process according to claim 1, wherein the waste water has COD values of from 200 to 5000.

8. A process according to claim 1, wherein the adsorption tower is operated at a temperature of from 10° C. to 30° C., the pH of the waste water is adjusted to from 5 to 8 and the flow quantity arising in the second stage is adjusted such that the surface-specific flow through the tower is from 1 to 1.8 m$^3$/m$^2$.h.

* * * * *